United States Patent
Ye et al.

(10) Patent No.: US 8,983,203 B2
(45) Date of Patent: Mar. 17, 2015

(54) FACE-TRACKING METHOD WITH HIGH ACCURACY

(71) Applicant: ULSee Inc., Taipei (TW)

(72) Inventors: Zhou Ye, Foster City, CA (US); Ying-Ko Lu, Taoyuan County (TW); Sheng-Wen Jeng, Tainan (TW)

(73) Assignee: ULSee Inc., Taipei (TW)

( * ) Notice: Subject to any disclaimer, the term of this patent is extended or adjusted under 35 U.S.C. 154(b) by 250 days.

(21) Appl. No.: 13/649,170

(22) Filed: Oct. 11, 2012

(65) Prior Publication Data

US 2013/0094768 A1    Apr. 18, 2013

Related U.S. Application Data

(60) Provisional application No. 61/547,040, filed on Oct. 14, 2011.

(51) Int. Cl.
| | |
|---|---|
| *G06K 9/48* | (2006.01) |
| *G06K 9/00* | (2006.01) |
| *G06K 9/46* | (2006.01) |
| *G06K 9/62* | (2006.01) |
| *G06T 7/00* | (2006.01) |
| *G06T 7/20* | (2006.01) |

(52) U.S. Cl.
CPC .......... *G06K 9/6209* (2013.01); *G06K 9/00248* (2013.01); *G06T 7/0083* (2013.01); *G06T 7/204* (2013.01); *G06T 2207/20116* (2013.01); *G06T 2207/30201* (2013.01)
USPC ............................ 382/199; 382/118; 382/203

(58) Field of Classification Search
None
See application file for complete search history.

(56) References Cited

U.S. PATENT DOCUMENTS

| | | | | |
|---|---|---|---|---|
| 7,218,760 | B2* | 5/2007 | Gu et al. | 382/118 |
| 7,697,736 | B2* | 4/2010 | Kee et al. | 382/118 |
| 7,706,575 | B2* | 4/2010 | Liu et al. | 382/118 |
| 8,121,347 | B2* | 2/2012 | Metaxas et al. | 382/103 |
| 8,582,834 | B2* | 11/2013 | Tong et al. | 382/118 |
| 8,737,697 | B2* | 5/2014 | Morishita | 382/118 |
| 2010/0202696 | A1* | 8/2010 | Usui et al. | 382/190 |

* cited by examiner

*Primary Examiner* — Daniel Mariam
(74) *Attorney, Agent, or Firm* — Alan D. Kamrath; Kamrath IP Lawfirm, P.A.

(57) ABSTRACT

A face-tracking method with high accuracy is provided. The face-tracking method includes generating an initial face shape according to the detected face region of an input image and a learned data base, wherein the initial face shape comprises an initial inner shape and an initial outer shape; generating a refined inner shape by refining the initial inner shape according to the input image and the learned data base; and generating a refined outer shape by searching an edge of the refined outer shape from the initial outer shape toward the limit of outer shape.

13 Claims, 5 Drawing Sheets

FACE-TRACKING METHOD WITH HIGH ACCURACY

FIELD OF THE INVENTION

The present invention relates to computer vision, and more particularly, to a face-tracking method with high accuracy.

BACKGROUND OF THE INVENTION

Generally speaking, face-tracking refers to a computer vision technology that extracts the shapes of human faces in arbitrary digital images. It detects facial features and ignores anything else in surrounding, such as furniture or dogs. According to the related art, there are many conventional face tracking methods (e.g., snake, AAM, CLM . . . , etc.) based on face detection to detect face region and then set an initial shape (which is composed by feature points) inside the region, and the content of a given part in face region of an image is extracted to get features and then go fine tuning the face shape to fit features in the image face.

However, these methods may result in false shape extractions due to over/under face region detection or target-like background noises, and the following processes (e.g., the power saving application or the camera application) based on the face detection results would be affected by the false shape extractions. Therefore, there is a need for an innovative face-tracking scheme which is capable of extracting face shapes accurately.

SUMMARY OF THE INVENTION

The present invention provides a face-tracking method with high accuracy. The face-tracking method comprises generating an initial face shape according to a detected rectangle face region in an input image and a learned data base, wherein the initial face shape comprises an initial inner shape and an initial outer shape; generating a refined inner shape by refining the initial inner shape according to the features in the input image and the learned data base; and generating a refined outer shape by searching features composed by edges of the refined outer shape from the initial outer shape outward to limits of the defined possible outer shape.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

The main concept of the present invention is to improve the face-tracking accuracy especially when the background of an image is complicated or messy. In such condition, the performance of conventional face-tracking methods will be deteriorated, especially at face border. However, the present invention proposes a face-tracking method for analyzing images (i.e., face shape border detection) from the inside of a face toward outside with a predetermined distance so as to avoid the background noise interference and improve the face-tracking accuracy.

Figure 1:
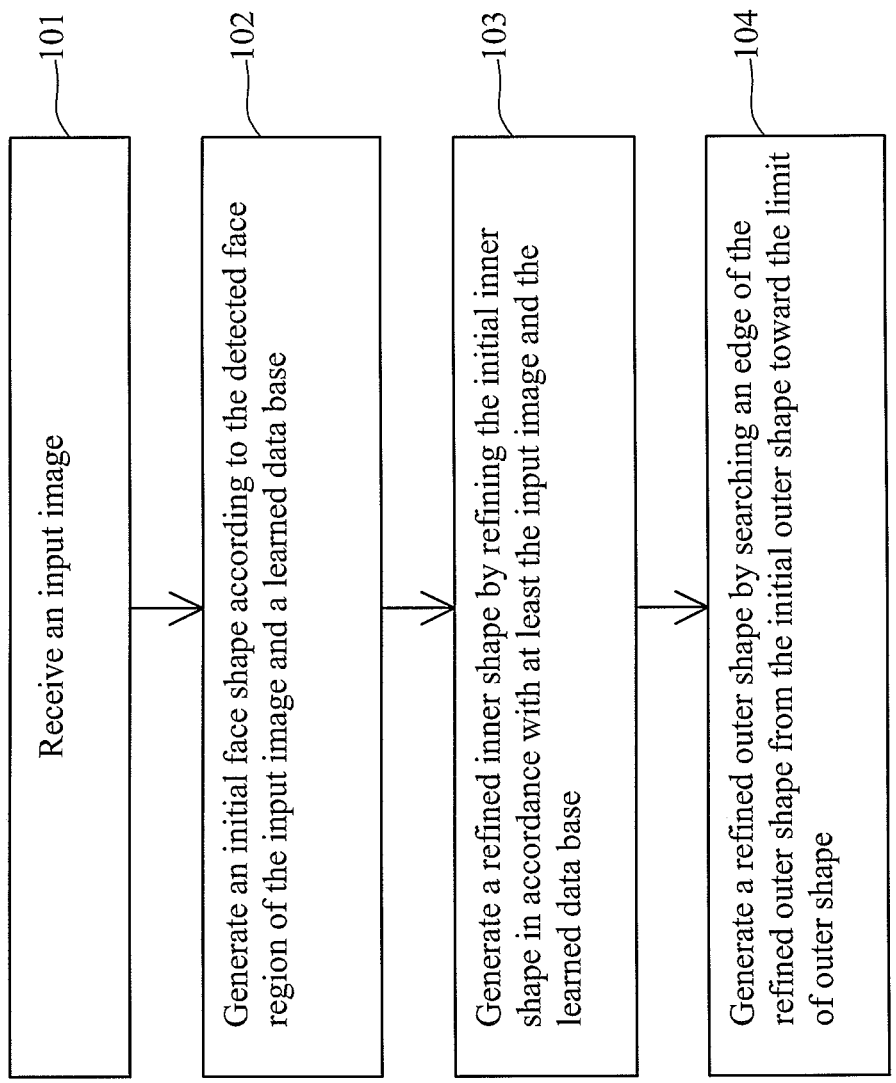
FIG. 1 is a flowchart illustrating a face-tracking method with high accuracy according to an exemplary embodiment of the present invention.
Figure 2:
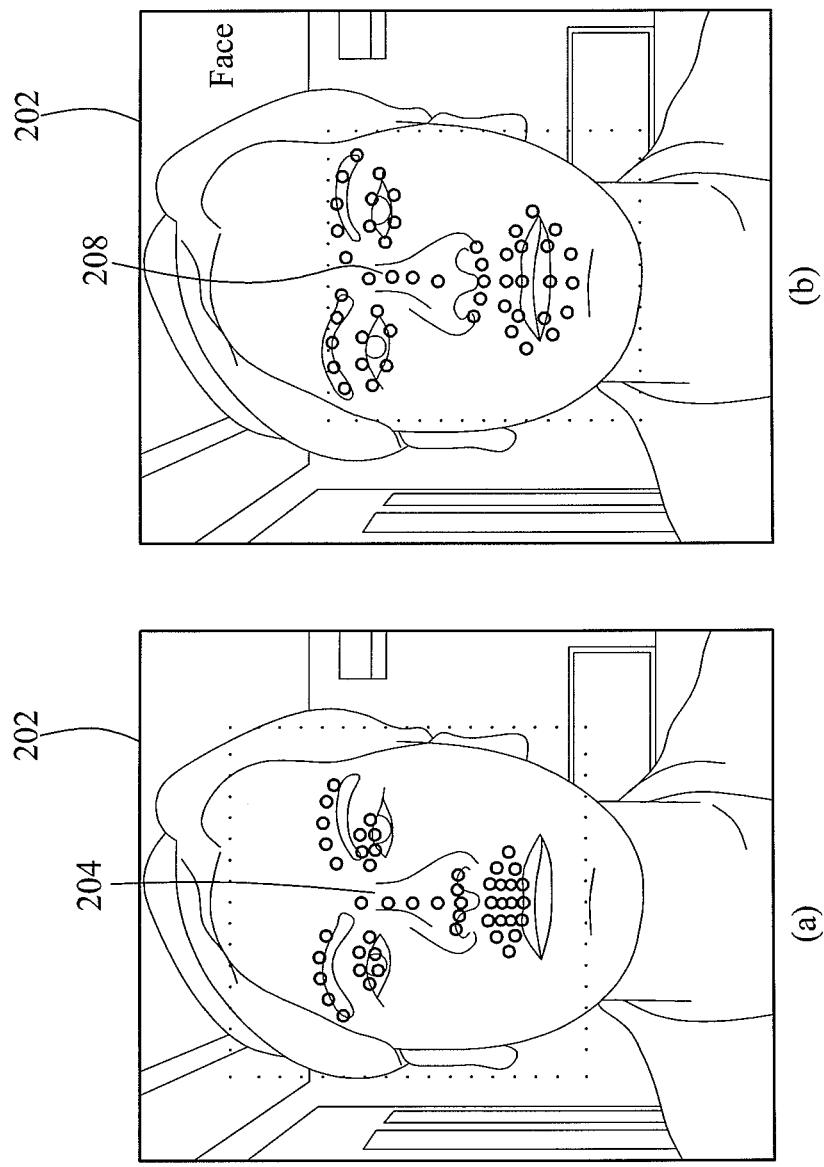
FIG. 2(a) is a diagram illustrating the face region of face detection result and initial inner shape of the face-tracking method with high accuracy according to an exemplary embodiment of the present invention.
FIG. 2(b) is a diagram illustrating the refined inner shape of the face-tracking method with high accuracy according to an exemplary embodiment of the present invention.

Please refer to FIG. 1 and FIG. 2. FIG. 1 is a flowchart illustrating a face-tracking method 100 with high accuracy according to an exemplary embodiment of the present invention. FIG. 2(a) is a diagram illustrating the face region of face detection result and initial inner shape of the face-tracking method with high accuracy according to an exemplary embodiment of the present invention. FIG. 2(b) is a diagram illustrating the refined inner shape of the face-tracking method with high accuracy according to an exemplary embodiment of the present invention. Provided that substantially the same result is achieved, the Steps in FIG. 1 need not be in the exact order shown and need not be contiguous, that is, other Steps can be intermediate. Besides, some Steps in FIG. 1 may be omitted according to various types of embodiments or requirements. In this embodiment, the detailed operation for face-tracking may comprise the following Steps:

Step 101: Receive an input image 202 (Refer to FIG. 2);
Step 102: Generate an initial face shape according to the detected face region (the rectangle with dot line in FIG. 2(a)) of the input image 202 and a learned data base, wherein the initial face shape comprises at least an initial inner shape 204 and an initial outer shape (not shown here, defined in FIG. 3 as 'initial shape');
Step 103: Generate a refined inner shape 208 by refining the initial inner shape 204 in accordance with at least the input image 202 and the learned data base;
Step 104: Generate a refined outer shape by searching an edge of the refined outer shape from the initial outer shape toward the limit of outer shape.

In Step 101, the input image 202 can be a frame of a video, a picture, and so on. After the input image 202 is received in Step 101, Step 102 is executed to operate a face detection on the input image 202 to get a face region (the rectangle with dot line in FIG. 2(a)) for generating an initial inner shape 204 and an initial outer shape according to a learned data base. Please refer to FIG. 2(a), which is a diagram illustrating the face detection of the face-tracking method 100 with high accuracy according to an exemplary embodiment of the present invention. An initial face shape at a detected face region may be set with help of the learned data base of many various "human faces". More specifically, in Step 102, a generic face shape model with n feature points is built according to the learned data base, and a generative shape of the initial face shape $S_i(\theta)$, i=1, . . . , n, can be described as equation (1):

$$S_i(\theta) = sR(\overline{s_i} + \Gamma_i \gamma) + t;\ \theta = \{s, R, \gamma, t\} \qquad (1);$$

wherein the initial face shape comprises at least the initial inner shape 204 and the initial outer shape, and $(\overline{s}_i, \Gamma_i)$ are the learned data base which comprises average shape $\overline{s}_i$ and deformation span basics $\Gamma_1$, and $\theta$ comprises geometric factors s, R, t, and $\Gamma$, wherein s represents a scaling factor, R represents a rotation matrix (composed by roll, yaw and pitch), t represents a translation factor, and $\gamma$ represents deformation parameters which are adjustable parameters utilized for fitting various face shape in the input image 202.

It should be noted that in Step 102, the geometric factors s, R, t, and $\gamma$ are just rough values and under no posture conditions, e.g. roll, yaw, or pitch. In other words, these geometric factors are not refined yet, and have to be refined through further fitting process. Consequently, the initial inner shape 204 and the initial outer shape are just rough results as well and need to be refined at the following Step 103. Moreover, the n feature points may have errors due to the difference between the generic face shape model of the learned data base and the real face shape in the input image 202.

In Step 103, some optimization algorithms are used to iteratively tune the initial shape to match the extracted features in real image face shape, and do not stop until some criteria are met. For better understanding of technical features of the present invention, one optimization algorithm to match an image $(x_i, y_i)$ with model as mentioned above to find optimum $\theta$ and $z_i$ are described in equation (2):

$$\min_{\{z_i\}_{i=1}^{n}, \theta} \sum_{i=1}^{n} \rho(\|[x_i, y_i; z_i] - S_i(\theta)\|^2; \sigma). \quad (2)$$

However, this is for illustrative purposes only, and is not meant to be a limitation of the present invention. The optimization algorithms or schemes may be modified according to different optimization algorithms or schemes. As a person skilled in the art can readily understand details of the optimization methods described in equation (2), and further description is omitted here for brevity.

Please refer to FIG. 2(b), which is a diagram illustrating the refined inner shape of the face-tracking method 100 with high accuracy according to an exemplary embodiment of the present invention. The refined inner shape 208 thereby is generated through the optimization algorithms mentioned above, and the refined inner shape 208 may be supposed to be more accurate than the initial inner shape 204 as shown in FIG. 2(a). For example, the position and the shape of the mouth in the refined inner shape 208 are presented more accurately comparing with the initial inner shape 204. Furthermore, the geometric factors which describes a posture of the refined inner shape 208 is also refined in Step 103, wherein the geometric factors comprises at least the scaling factor s, the rotation matrix R, and the translation factor t as mentioned above. In other words, the refined inner shape 208 comprises the posture, e.g. roll, yaw, or pitch information in Step 103.

In general, since there is only skin around the inner face shape, and the background around the outer face shape may appear with some unexpected objects, the background around the outer face shape of the input image 202 is much more complicated than the background around the inner face shape. Considering the fact mentioned above, the present invention processes the refined inner shape 208 first, and then processes the refined outer shape or the whole face shape. In this way, the refined inner shape 208 would be generated stably and precisely. In Step 104, after inner shape has been extracted, an initial outer shape and many scan line segments may be set for searching correct outer shape (face border) from inside to outside direction from a face center.

Figure 3:
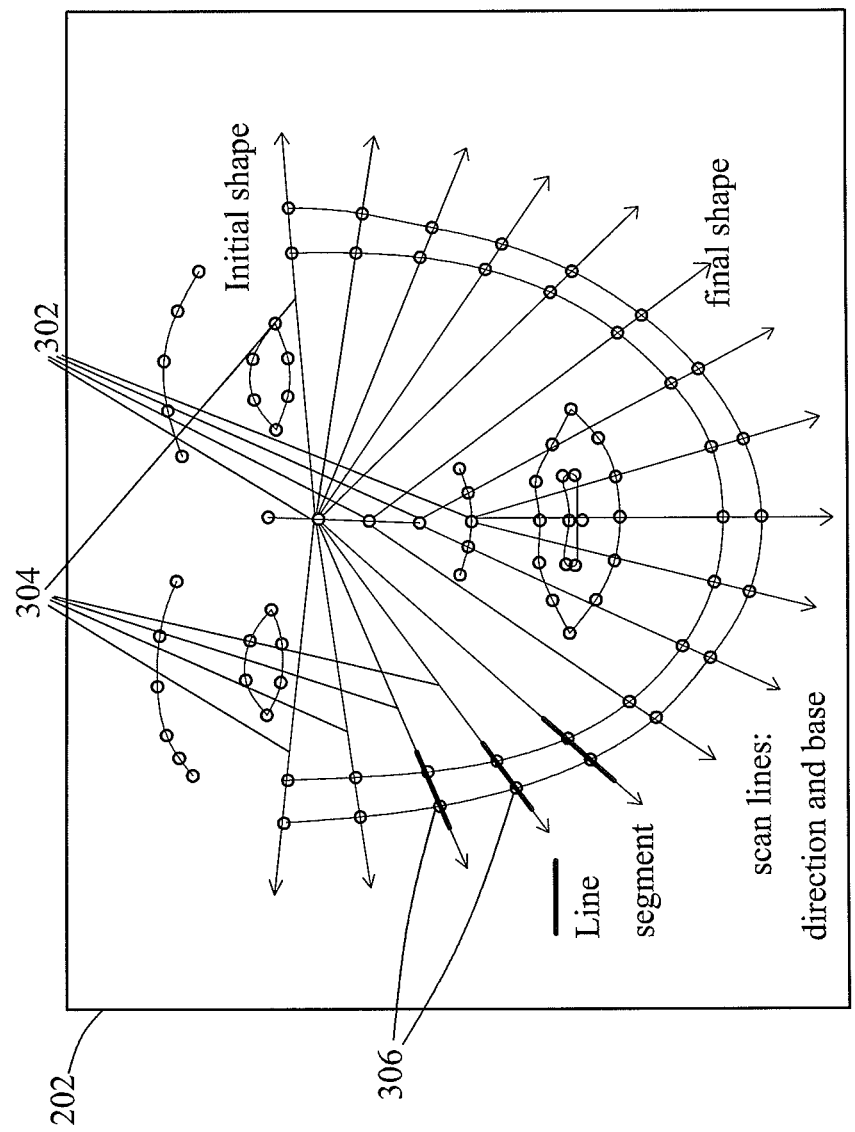
FIG. 3 is a diagram illustrating searching edges of the refined outer shape from the initial outer shape toward the limit of outer shape of the face-tracking method with high accuracy according to an exemplary embodiment of the present invention.

Please refer to FIG. 3, which is a diagram illustrating searching an edge of the refined outer shape from the initial outer shape toward the limit of outer shape according to an exemplary embodiment of the present invention. In FIG. 3, the initial outer face shape has 17 feature points and may be separated into several groups. For example, the 17 feature points may be separated into 4 groups, and more specifically, each of the groups has a common base point 302 which are selected from the points of the refined inner shape 208. Then, 17 scan lines 304 which corresponding to the 17 feature points are generated from the corresponding common base points 302 toward the limit of outer face shape respectively, and 17 line segments 306 are set respectively on the 17 scan lines to indicate a searching range for the following searching process.

Any object outside the line segments 306 would be ignored, hence the searching process may avoid identifying most of the undesired objects at background and the searching process would be efficient. For example, line segments can be defined as a n dimensions 2D image point $p_i(xi, yi)$ arrays ArrayP$_k$[p$_i$], i=0, 1, ..., n−1 and k=0, 1, ..., 16. Please note that this setting is initially under no posture (no roll, yaw and pitch) condition. The image coordinates of each point in the scan line segment arrays ArrayP$_k$[p$_i$] should be transformed to correct position before doing searching operation. For example, each point p$_i$ in ArrayP$_k$[p$_i$] may be transformed to (as equation (3)):

$$p'_i = sRp_i + t \quad (3);$$

wherein s, R, t are the scaling factor, the Rotation matrix (composed by head roll, yaw and pitch) and the translation factor as defined in equation (1). Therefore, refined arrays of the scan line segment 306 for searching usage is ArrayP$_k$[p'$_i$]. According to the embodiment of the present invention, the searching process may be configured to a direct searching in the one dimensional refined arrays ArrayP$_k$[p'$_i$] of the scan line segment 306 in an in-to-out direction.

Figure 4:
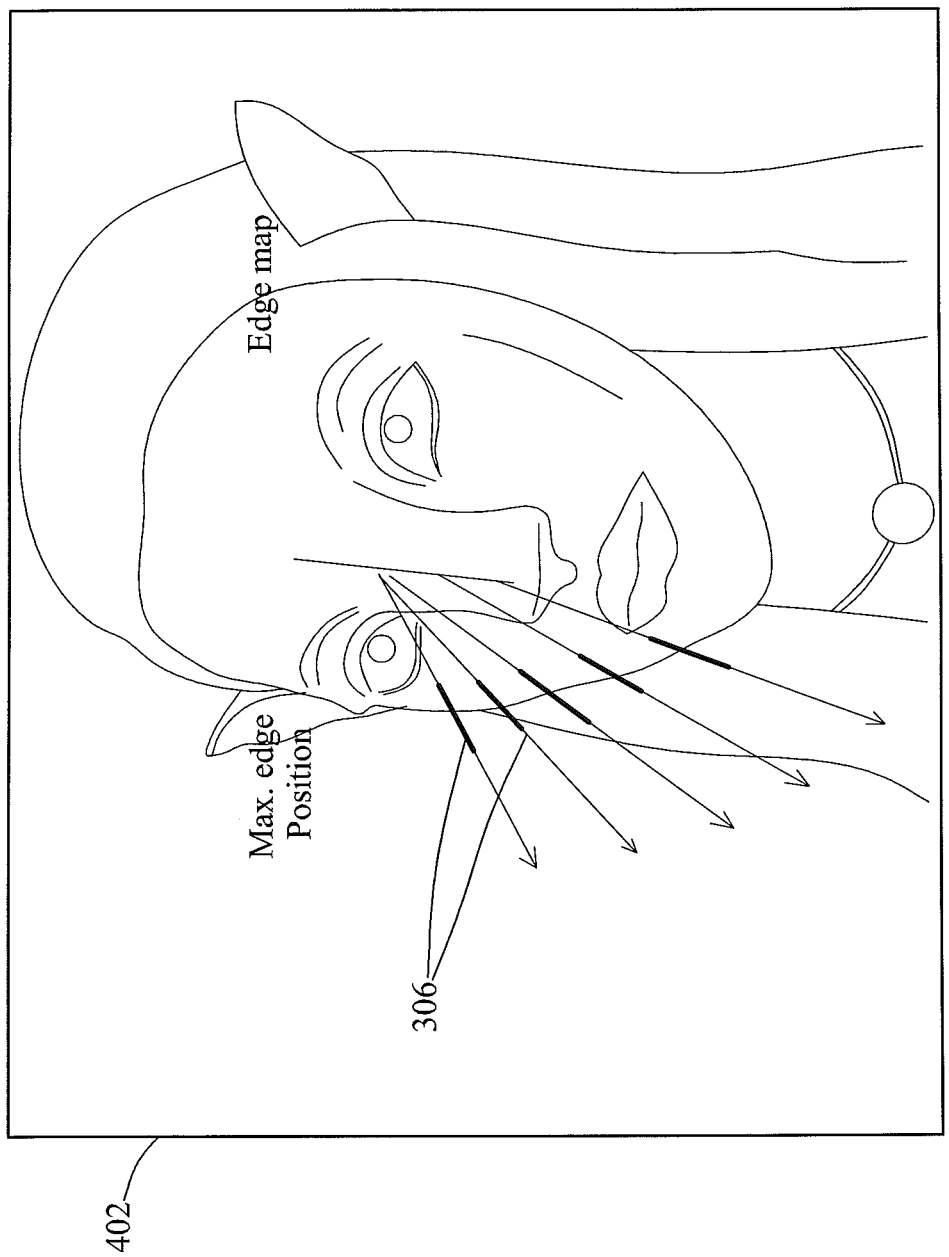
FIG. 4 is a diagram illustrating a direct searching process of the face-tracking method with high accuracy according to an exemplary embodiment of the present invention.

Firstly, the input image 202 is processed by any one well known edge detection method to get an 'edge map' for further processing, for example, the Sobel edge detection. However, this is for illustrative purposes only, and is not meant to be a limitation of the present invention. The edge detection method or scheme may be modified, wherein other methods may be employed according to different edge detection. Please refer to FIG. 4, which is a diagram illustrating a direct searching process according to an embodiment of the present invention. An edge map 402 is generated from the input image 202 according to the aforementioned edge detection method or scheme, Then, refined arrays ArrayP$_k$[p'$_i$] of the scan line segment 306 are searched from index i=0 to i=n−1 (i.e. from inward to outward direction) to find a maximum edge point, which is the border of the outer face shape we find in this Step, assume it is $p_{max(i,k)}$, where (i, k) represents the maximum edge point at indexed number i in k scan line segment.

Figure 5:
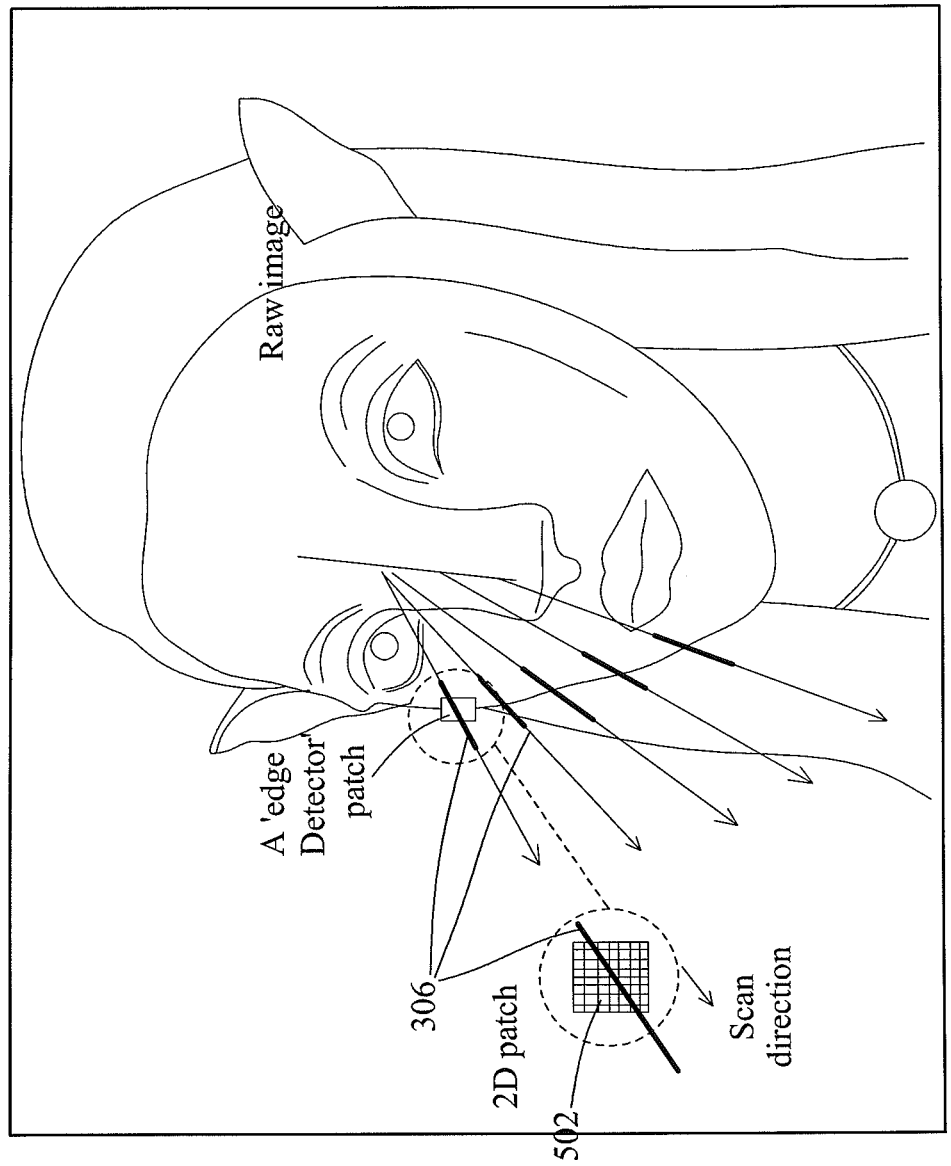
FIG. 5 is a diagram illustrating a 2D directional searching process of the face-tracking method with high accuracy according to another exemplary embodiment of the present invention.

In another embodiment of the present invention, a searching process is configured to be 2D directional searching along the refined arrays ArrayP$_k$[p'$_i$] of the scan line segment 306 with a 2D patch 'edge detector'. Please refer to FIG. 5, which is a diagram illustrating a 2D directional searching process according to another embodiment of the present invention. A 2D patch 502 as shown in FIG. 5 is capable of performing a directional searching for the maximum edge point. The patch is a window (for example, 15×15 pixels, but not limited) centering at a point in the refined arrays ArrayP$_k$[p'$_i$] of the scan line segment 306 and is suitable for implementing a 2D edge detector. For better understanding of technical features of the present invention, one 2D edge detection method to search along the refined arrays ArrayP$_k$[p'$_i$] of the scan line segment 306 are described as an example. However, this is for illustrative purposes only, and is not meant to be a limitation of the present invention. Many well know 2D edge detection methods or schemes can be used to achieve the same objective also belong to the scope of the present invention. As a result, the maximum edge point p$_{max(i,k)}$ can be found as the border of the outer face shape.

After each maximum edge point p$_{max(i,k)}$ has been found (if no edge found in some line segment, the maximum edge point in p$_{max(i,k)}$ of the line segment would be omitted), one optimization algorithm similar to Equation (2) can be used to determine the refined outer shape. Equation (4) shows this optimization equation, where the shape (face border) generated from the searching process with total n maximum edge points (e.g., 17 points in this embodiment) is subtracted by predicted shape S$_k$(θ) from the learned data base and z$_k$ and θ are estimated by optimization and minimization process until some converge condition (stop criteria) met. Note that we only need take deformation parameters γ into account in θ (includes the scaling factor s, the rotation matrix (composed by roll, yaw and pitch) R, the translation factor t, and the deformation parameters γ, but not limited to) because the scaling factor s, the rotation matrix R, and the translation factor t are determined when we obtained the refined inner shape 208. In addition, some geometry constrains, for example, reflection symmetry with respect to the left face and the right face, can be imposed upon the optimization and minimization process to improve the fitting correctness as Equation (5).

$$\min_{\{z_k\}|k,\theta} \sum_{k=0}^{n-1} \rho(\|[p_{max(i,k)}; z_k] - S_k(\theta)\|^2; \sigma) \quad (4)$$

.Assume center at (0,0,0), no rotation for (k=0; k<n/2; k++)

$$|[p_{max(i,k)}; z_k] - [p_{max(i,n-k)}; z_{n-k}]| < \delta \quad (5)$$

Wherein |.| denotes the distance between two points, δ is a threshold value.

It is an advantage of the present invention that the present invention method can provide an improved flow for face-tracking process. In addition, the improved flow for face-tracking process is suitable for various kinds of, where a traditional face-tacking or detection process can be altered with ease based upon the embodiments disclosed above, to prevent the related art problems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A face-tracking method with high accuracy, wherein the method is performed using a computer or a processor, comprising:
    generating an initial face shape according to a detected face region of an input image and a learned data base, wherein the initial face shape comprises an initial inner shape and an initial outer shape;
    generating a refined inner shape by refining the initial inner shape according to the input image and the learned data base; and
    searching an edge of a refined outer shape by moving the initial outer shape toward a limit, so as to generate the refined outer shape, wherein the step comprises:
        setting at least one scan line segment which starts from a point of the initial outer shape;
        searching at least one maximum edge point along the at least one scan line segment; and
        generating the refined outer shape by optimizing the at least one maximum edge point.

2. The face-tracking method of claim 1, wherein the step of generating the refined inner shape further comprises:
    generating the refined inner shape and the plurality of geometric factors which describes a posture of the refined inner shape.

3. The face-tracking method of claim 2, wherein the plurality of geometric factors comprises a scaling factor, a rotation matrix, and a translation factor.

4. The face-tracking method of claim 1, wherein the step of setting at least one scan line segment which starts from a point of the initial outer shape comprises:
    setting at least one angle for the at least one scan line segment respectively; and
    setting at least one length for the at least one scan line segment respectively.

5. The face-tracking method of claim 4, wherein setting the at least one angle for the at least one scan line segment respectively is based on the refined inner shape and learned data base.

6. The face-tracking method of claim 4, wherein setting the at least one length for the at least one scan line segment respectively is based on the refined inner shape and learned data base.

7. The face-tracking method of claim 4, wherein the step of setting the at least one scan line segment which starts from the point of the initial outer shape further comprises:
    transforming the at least one scan line segment in accordance with the plurality of geometric factors which describes the posture of the refined inner shape.

8. The face-tracking method of claim 7, wherein the plurality of geometric factors comprises a scaling factor, a rotation matrix, and a translation factor.

9. The face-tracking method of claim 1, wherein the step of searching the at least one maximum edge point along the at least one scan line segment comprises:
    performing an edge detection process upon the input image to find edges in the input image; and
    finding the at least one maximum edge point by performing an one dimensional edge detection process along the at least one scan line segment.

10. The face-tracking method of claim 9, wherein the edge detection process is a Sobel edge detection process.

11. The face-tracking method of claim 1, wherein the step of searching the at least one maximum edge point along the at least one scan line segment further comprises:
    finding the at least one maximum edge point by performing a two dimensional edge detection process along the at least one scan line segment.

12. The face-tracking method of claim 1, wherein the step of generating the refined outer shape by optimizing the at least one maximum edge point comprises:
    optimizing the at least one maximum edge point in accordance with the initial shape and the plurality geometric factors.

13. The face-tracking method of claim 12, wherein the step of generating the refined outer shape by optimizing the at least one maximum edge point further comprises:

optimizing the at least one maximum edge point according to a deformation factor and a symmetric reflection constraint.

* * * * *